(12) United States Patent
Tan et al.

(10) Patent No.: US 9,145,945 B2
(45) Date of Patent: Sep. 29, 2015

(54) ACTIVE VIBRATION ISOLATION DEVICE BASED ON ELECTROMAGNETIC AND AEROSTATIC FLOATATION

(71) Applicant: HARBIN INSTITUTE OF TECHNOLOGY, Heilongjiang (CN)

(72) Inventors: Jiubin Tan, Heilongjiang (CN); Lei Wang, Heilongjiang (CN); Rongwei Wen, Heilongjiang (CN); Bo Zhao, Heilongjiang (CN); Yuanyuan Yang, Heilongjiang (CN)

(73) Assignee: HARBIN INSTITUTE OF TECHNOLOGY, Nangang District, Harbin, Heilongjiang (CN)

( * ) Notice: Subject to any disclaimer, the term of this patent is extended or adjusted under 35 U.S.C. 154(b) by 0 days.

(21) Appl. No.: 14/376,412

(22) PCT Filed: Feb. 26, 2013

(86) PCT No.: PCT/CN2013/071884
§ 371 (c)(1),
(2) Date: Aug. 1, 2014

(87) PCT Pub. No.: WO2013/181950
PCT Pub. Date: Dec. 12, 2013

(65) Prior Publication Data
US 2014/0374565 A1  Dec. 25, 2014

(30) Foreign Application Priority Data
Jun. 9, 2012  (CN) .......................... 2012 1 0201284

(51) Int. Cl.
F16M 13/00 (2006.01)
F16F 15/023 (2006.01)
F16F 15/03 (2006.01)

(52) U.S. Cl.
CPC ............... *F16F 15/023* (2013.01); *F16F 15/03* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,159,464 A | * | 6/1979 | Hall, Jr. ........................ | 367/182 |
| 4,363,217 A | * | 12/1982 | Venuti ............................ | 62/55.5 |
| 4,432,441 A | * | 2/1984 | Kurokawa ..................... | 188/267 |
| 4,624,435 A | * | 11/1986 | Freudenberg ................ | 248/550 |
| 4,860,543 A | * | 8/1989 | Higham et al. ..................... | 62/6 |
| 5,116,029 A | * | 5/1992 | Gennesseaux ........... | 267/140.14 |
| 5,129,232 A | * | 7/1992 | Minas et al. .................... | 62/51.1 |
| 5,297,781 A | * | 3/1994 | Gennesseaux ........... | 267/140.14 |
| 5,439,082 A | * | 8/1995 | McKeown et al. ............ | 188/379 |
| 5,450,375 A | * | 9/1995 | Woo ............................ | 367/188 |

(Continued)

*Primary Examiner* — Monica Millner
(74) *Attorney, Agent, or Firm* — Tianhua Gu; Global IP Services

(57) ABSTRACT

This invention relates to an active vibration isolation installation based on electromagnetic and aerostatic floatation which is essential for the super-precision measurement and manufacture. It mainly consists of an isolation platform, an intermediate sleeve and a base. The isolation platform supports any object(s) placed on the platform and is supported by the intermediate sleeve. And the intermediate sleeve is supported on the base which is fixed on the ground. This invention uses the combination electromagnetic and aerostatic floatation to achieve large bearing capacity while excellent vibration isolation performance is maintained. This invention realizes automatic control of stiffness, using closed-loop speed control methods. It is therefore conclude that this invention can impose an excellent inhibitory action on the vibration originating from surroundings and the platform itself.

5 Claims, 1 Drawing Sheet

(56) References Cited

U.S. PATENT DOCUMENTS

| | | | |
|---|---|---|---|
| 5,726,512 A * | 3/1998 | Chu et al. | 310/90.5 |
| 5,810,336 A * | 9/1998 | Gennesseaux | 267/140.14 |
| 5,927,699 A * | 7/1999 | Nakajima et al. | 267/140.14 |
| 5,957,440 A * | 9/1999 | Jones et al. | 267/140.14 |
| 6,209,692 B1 * | 4/2001 | Pels et al. | 188/381 |
| 6,327,024 B1 * | 12/2001 | Hayashi et al. | 355/53 |
| 6,378,672 B1 * | 4/2002 | Wakui | 188/378 |
| 6,464,213 B1 * | 10/2002 | Kojima | 267/140.14 |
| 6,938,889 B2 * | 9/2005 | Chuang | 267/140.15 |
| 7,275,627 B1 * | 10/2007 | Mayama | 188/378 |
| 7,686,144 B2 * | 3/2010 | Shibayama et al. | 188/378 |
| 7,918,431 B2 * | 4/2011 | Ham | 248/560 |
| 8,177,041 B2 * | 5/2012 | Rodenbeck | 188/266.5 |
| 8,186,490 B2 * | 5/2012 | Melz et al. | 188/266.7 |
| 8,499,907 B2 * | 8/2013 | Smith et al. | 188/378 |
| 8,820,492 B1 * | 9/2014 | Kavlicoglu et al. | 188/267.2 |
| 8,882,091 B2 * | 11/2014 | Lee et al. | 267/140.14 |
| 2002/0017749 A1 * | 2/2002 | Fujita et al. | 267/140.15 |
| 2003/0155822 A1 * | 8/2003 | Nadeau et al. | 310/51 |
| 2005/0158193 A1 * | 7/2005 | Roke et al. | 417/417 |
| 2007/0001354 A1 * | 1/2007 | Stothers et al. | 267/136 |
| 2007/0273074 A1 * | 11/2007 | Mizuno et al. | 267/140.15 |
| 2008/0191118 A1 * | 8/2008 | Johnson et al. | 248/638 |
| 2008/0290624 A1 * | 11/2008 | Yamanaka et al. | 280/124.154 |
| 2009/0020381 A1 * | 1/2009 | Hindle et al. | 188/267 |
| 2011/0018214 A1 * | 1/2011 | Kondo | 280/5.515 |

\* cited by examiner

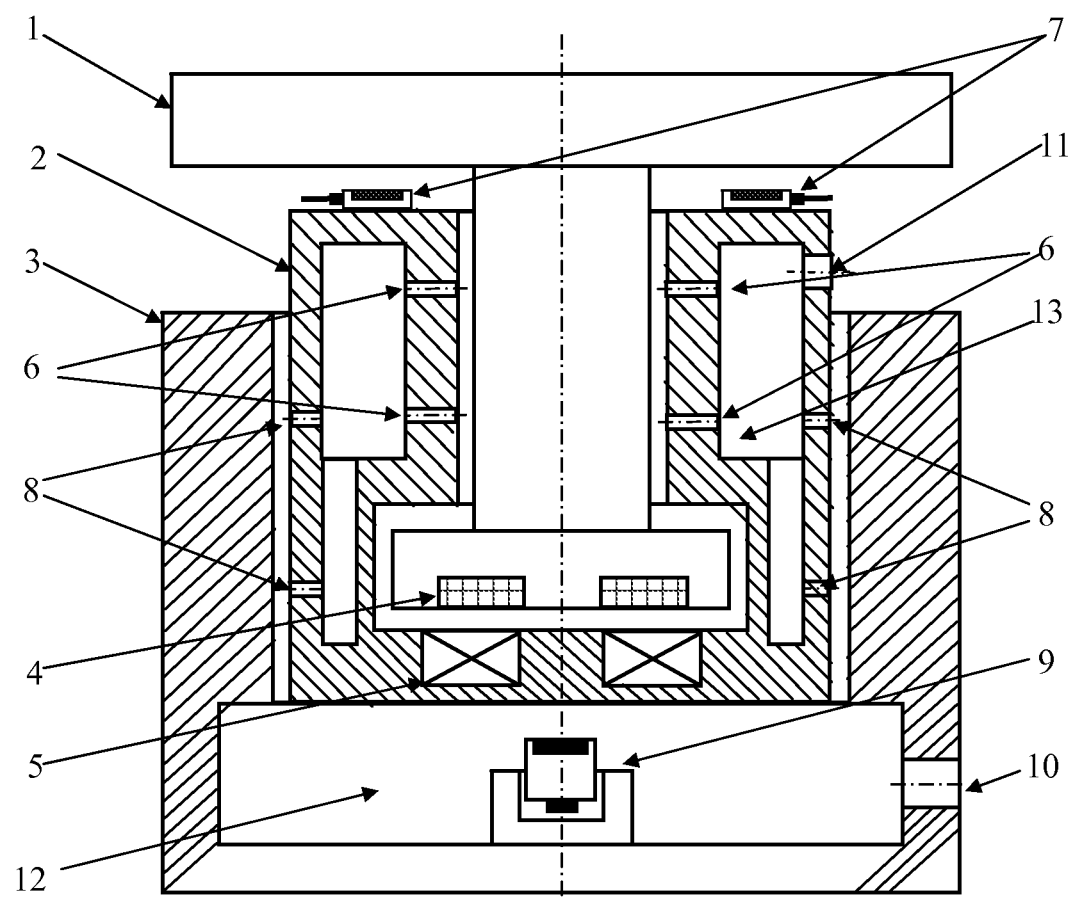

ACTIVE VIBRATION ISOLATION DEVICE BASED ON ELECTROMAGNETIC AND AEROSTATIC FLOATATION

CROSS REFERENCE TO RELATED PATENT APPLICATION

The present application is the US national stage of PCT/CN2013/071884 filed on Feb. 26, 2013, which claims the priorities of the Chinese patent applications No. 201210201284.1 filed on Jun. 9, 2012, which applications are incorporated herein by reference.

TECHNICAL FIELD

This invention relates to an active vibration isolation device based on electromagnetic and aerostatic floatation, which is essential for super-precision measurement and manufacturing.

BACKGROUND ARTS

A platform with perfect horizontal straightness provides a basic guarantee for the precision measurement and manufacture of large scale integrated circuits in the field of super-precision measurement and manufacturing. It is widely used for many advanced production and measurement systems such as biology study, electron optics manufacture, precision machining, physical and chemical tests and etc. The control of its horizontal straightness has its effect on the measurements of machinery and the performance of instruments and directly effects on the suppression of platform with aerostatic floatation on vibration. The effect of environmental vibration on instrument and equipment increases as the super-precision measurement instrument and super-precision manufacturing instrument are increasingly updated. As a newly developed vibration isolation device, the platform with an electromagnetic and aerostatic floatation is developing with the development of precision instrument manufacture industry, the high speed development of ultra-large scale integrated circuits manufacture industry in particular, and as the measurement accuracy and stability requirements are becoming increasingly stringent as well.

Interferences to super-precision measurement instrument and manufacturing equipment are mainly generated at frequencies in the range of 0.8~100 Hz. There are two kinds of vibration sources, one comes from the ground and the other comes from the platform itself. Passive isolation system is widely used to separate the platform from ground vibration. A passive isolation system usually does an excellent job at high frequency. But it does not work very well at low frequency and in reducing direct disturbance to the platform. So active isolation systems are now becoming more and more popular, because of their excellent vibration isolation performances. However, these active isolation systems need sensitive sensors and a large amount of energy from actuators. And the high cost of these systems places another obstacle to their further applications.

Taksehi Mizuno from Japan Saitama University used zero-power control strategy and proposed a magnetic suspension structure, to realize infinite stiffness and to reduce the direct disturbance. They proposed a solution to the problems of vibration isolation, but their proposed method still has its obvious drawback. The isolator's size and carrying capacity are limited because vibration isolation is achieved using mechanical springs. In addition, the position accuracy of the platform cannot go up to a micron or submicron level. Nowadays, there is a common problem with active or passive vibration isolation systems, such as complex structure, high manufacturing cost and stringent requirement for sensors and actuators.

SUMMARY OF INVENTION

One aspect of the invention aiming at providing an active vibration isolation device based on electromagnetic and aerostatic floatation is proposed to isolate the vibrations originating from surroundings and the platform itself. The device adaptively combines aerostatic floatation with electromagnetic floatation. This invention features the adaptive combination of the negative stiffness characteristics of electromagnetic floatation and the large bearing capacity of aerostatic floatation. The stiffness of the vibration isolation is adjusted using a closed-loop speed control system. Consequently, large bearing capacity and proper vibration isolation performance is achieved.

One embodiment of the invention directs to a vibration isolation device mainly consists of an isolation platform, an intermediate sleeve and a base. The intermediate sleeve with an annular air chamber is placed inside the base, and there is a cylindrical air cavity below the intermediate sleeve. A non-contact vertical displacement sensor B is fitted in the cylindrical air chamber to measure the height of intermediate sleeve. There is an air inlet hole in the base sidewall, which connects with the cylindrical air chamber. The isolation platform is placed in the intermediate sleeve, and there are several air bearing holes in the intermediate sleeve, through which air will be charged into the interspace separating the two parts. The electromagnetic coil and the permanent magnet are fixed on the bottom surfaces of isolation platform and intermediate sleeve respectively. Vertical displacement sensor A is mounted on the top of intermediate sleeve.

Technical Effect of the Invention

1. This invention applies the electromagnetic and aerostatic techniques, to achieve large bearing capacity and maintains high vibration isolation performance.
2. This invention realizes the automatic control of stiffness using a closed-loop speed control method. Consequently, this invention imposes an inhibitory action on the vibration interference from both surroundings and platform itself.

DESCRIPTION OF DRAWING

The FIGURE attached illustrates the structure of an active vibration isolation device based on electromagnetic and aerostatic floatation; wherein (1) Isolation platform, (2) Intermediate sleeve, (3) Base, (4) Permanent magnet, (5) Electromagnetic coil, (6) Inside static pressure air bearing holes, (7) Non-contact vertical displacement sensor A (first non-contact vertical displacement sensor), (8) Outside static pressure air bearing holes, (9) Non-contact vertical displacement sensor B (second non-contact vertical displacement sensor), (10) Air inlet hole in base, (11) Air inlet hole in intermediate sleeve, (12) Cylindrical air cavity; (13) Annular air cavity.

PREFERRED EMBODIMENTS

Following are further detailed descriptions of the invention in combination with relevant attached FIGURE.

The active vibration isolation device based on electromagnetic and aerostatic floatation mainly comprises a base (3), an intermediate sleeve (2), and an isolation platform (1). The base has a cylindrical air chamber (12) inside the base which is supplied with air through an inlet hole for the base (10);

the intermediate sleeve (2) is lose fitted into the base and is supported by the air in the cylindrical air chamber (12) such that a gap is formed between the intermediate sleeve (2) and the base, the intermediate sleeve is provided with an annular air cavity (13) which is supplied with air through an air inlet hole for the intermediate sleeve (11) and by which an internal sidewall from an external sidewall of the sleeve (2) is separated; and an central cavity that is defined by the internal sidewall; the internal sidewall is provided with air bearing holes (6) communicating the central cavity with the annular air cavity (13); the external side wall is provided with static pressure air bearing holes (8) communicating the annular air cavity (13) with the gap between the base and the intermediate sleeve (2) so that a first air film can be formed within the gap;

the isolation platform (1) has a contour that is in compliance with the shape of the central cavity is fitted into the central cavity of the intermediate sleeve (2) such that an second air film is formed within an interspace, which is in communication with the air bearing holes (6) on the internal sidewall, is formed between the central cavity and the isolation platform (1) and is filled with air coming from the annular air cavity (13);

An electromagnetic coil (5) is arranged on a bottom surface of the isolation platform (1); and a permanent magnet (4) is arranged on a bottom surface of the intermediate sleeve (2);

A non-contact vertical sensor A (7) is mounted on a top surface of the intermediate sleeve; and a non-contact vertical displacement sensor B (9) is mounted within the cylindrical air chamber (12).

The non-contact vertical displacement sensor A (7) and The non-contact vertical displacement sensor B (9) can be optical, eddy current or capacitance displacement sensors;

The permanent magnet (4) is made of rubidium-iron-boron materials;

Air is charged into the annular air cavity (13) of the intermediate sleeve through the air inlet hole (11). The air pressure inside the annular air cavity (13) is approximately 0.4~0.6 MPa;

There are layers of air film of 7 μm thick each between the isolation platform (1), the intermediate sleeve (2) and the base (3).

This invention can suppress interferences originating from surroundings and the platform itself at the same time. This invention can be used separately or in a group.

The isolation platform (1) and the intermediate sleeve (2) use the combination of electromagnetic and aerostatic floatation. The permanent magnet (4) is placed at the bottom of isolation platform (1), and the electromagnetic coil (5) is placed at the bottom of intermediate sleeve (2). The repulsive force produced between the permanent magnet (4) and the electromagnetic coil (5) depends on the turns of electromagnetic coil (5) and the size of permanent magnet (4), and it acts on the structure in the vertical direction. In addition, there is a support force produced by the high pressure air membrane between the two parts in the vertical direction.

The structures of intermediate sleeve (2) and base (3) use aerostatic floatation. The static pressure air bearing holes (8) are distributed separately in the external surface of intermediate sleeve (2). The air from the annular air cavity (13) is charged through the air inlet hole (11). Depending on the exact weight of vibration isolation device, the air pressure inside the annular air cavity (13) is about 0.4~0.6 MPa.

The base (3) is the outermost layer of the invention and it is fixed on the ground. The cylindrical air cavity (12) is placed inside the base (3) to provide the vertical displacement for the structure. The bearing capacity of the invention is mainly determined by the pressure inside the cylindrical air cavity (12) and the bottom size of the intermediate sleeve (2). Air is charged into the cylindrical air cavity (12) through the air inlet hole in base (10), and air loss is real-time compensated as necessary for maintenance of pressure stability.

There are air films distributed in the radial direction, between the isolation platform (1), the intermediate sleeve (2) and the base (3). Air is charged into the annular air cavity (13) through the air inlet hole in intermediate sleeve (11), then flows into the interspace between different structures through the static pressure air bearing holes (6, 8).

The non-contact vertical displacement sensor A (7) and B (9) may be optical, eddy current or capacitance displacement sensors. The sensor A (7) measures the variation of distance between the isolation platform (1) and the intermediate sleeve (2), while B measures the distance between the intermediate sleeve (2) and the base (3). The active control strategy is based on closed-loop speed control method. The magnitude of control force depends on the input current of electromagnetic coil determined by the displacement of the platform. For example, the platform (1) will go up under the action of negative stiffness strategy if there is a downward force acting on the isolation platform (1), and the intermediate sleeve (2) will descend under the action of positive stiffness characteristic of aerostatic floatation. The relative displacements are offset against each other and so, they can always be neglectable. Additionally, if the electromagnetic coil (5) is not under the speed closed-loop control and only fixed magnet field is provided to balance the weight of the load, the electromagnetic and aerostatic floatation in the device are equivalent to passive vibration isolation in principle, and functions to suppress external vibrations.

What is claimed is:

1. An active vibration isolation device based on electromagnetic and aerostatic floatation, comprising a base (3), having a cylindrical air chamber (12) inside the base which is supplied with air through an inlet hole for the base (10);

an intermediate sleeve (2), which is lose fitted into the base and is supported by the air in the cylindrical air chamber (12) such that a gap is formed between the intermediate sleeve (2) and the base, the intermediate sleeve is provided with an annular air cavity (13) which is supplied with air through an air inlet hole for the intermediate sleeve (11) and by which an internal sidewall from an external sidewall of the sleeve (2) is separated; and an central cavity that is defined by the internal sidewall; the internal sidewall is provided with air bearing holes (6) communicating the central cavity with the annular air cavity (13); the external side wall is provided with static pressure air bearing holes (8) communicating the annular air cavity (13) with the gap between the base and the intermediate sleeve (2) so that a first air film can be formed within the gap;

an isolation platform (1), having a contour that is in compliance with the shape of the central cavity is fitted into the central cavity of the intermediate sleeve (2) such that an second air film is formed within an interspace, which is in communication with the air bearing holes (6) on the internal sidewall, is formed between the central cavity and the isolation platform (1) and is filled with air coming from the annular air cavity (13);

an electromagnetic coil (5) arranged on a bottom surface of the isolation platform (1);

a permanent magnet (4) arranged on a bottom surface of the intermediate sleeve (2);

at least a first vertical sensor (7) that is mounted on a top surface of the intermediate sleeve; and a second non-contact vertical displacement sensor (9) arranged within the cylindrical air chamber (12).

2. A device according to claim 1, wherein the first non-contact vertical displacement sensor (7) and the second vertical sensor (9) are optical sensors, eddy current sensors or capacitance displacement sensors.

3. A device according to claim 1, wherein the permanent magnet (4) is made of rubidium-iron-boron materials.

4. A device according to claim 1, wherein the air is charged into annular air cavity (13) of the intermediate sleeve (2) through air inlet hole (11) such that the air pressure inside the annular air cavity (13) is maintained at approximately 0.4~0.6 MPa.

5. The device according to claim 1, wherein thickness of the first air film and the second air film is approximately 7 μm.

\* \* \* \* \*